US007121599B2

(12) United States Patent
Demar et al.

(10) Patent No.: US 7,121,599 B2
(45) Date of Patent: Oct. 17, 2006

(54) HAND-OPERATED TOOL WITH CENTRAL STEP

(75) Inventors: David Demar, Tenafly, NJ (US); Thomas VanDyk, Ramsey, NJ (US); Roland Charriez, Mohegan Lake, NY (US); Michael Ballone, New Providence, NJ (US); John Kiely, Morris Plains, NJ (US); Keith Kristiansen, Stratford, CT (US); Melissa Fisher, Columbus, OH (US); Brian J. Conaway, Columbus, OH (US); Mandi Reese, Westerville, OH (US); Terry M. Birchler, New Albany, OH (US); Mark C. Eyman, Columbus, OH (US)

(73) Assignee: UnionTools, Inc., Columbus, OH (US)

( * ) Notice: Subject to any disclaimer, the term of this patent is extended or adjusted under 35 U.S.C. 154(b) by 0 days.

(21) Appl. No.: 11/095,864

(22) Filed: Mar. 31, 2005

(65) Prior Publication Data

US 2005/0242599 A1    Nov. 3, 2005

Related U.S. Application Data

(60) Provisional application No. 60/567,380, filed on Apr. 30, 2004.

(51) Int. Cl.
*A01B 1/00*    (2006.01)
(52) U.S. Cl. .......................................... 294/60; 294/57
(58) Field of Classification Search ................. 294/57, 294/58, 60; 172/371, 372, 381; 254/131.5
See application file for complete search history.

(56) References Cited

U.S. PATENT DOCUMENTS

| 212,953 | A | * | 3/1879 | Kreider | 294/49 |
| 821,847 | A | * | 5/1906 | Arnavat | 294/57 |
| 1,207,472 | A | * | 12/1916 | Barton | 294/54.5 |
| 1,762,718 | A | * | 6/1930 | Hervey | 294/57 |
| 1,931,349 | A | * | 10/1933 | Francis | 30/315 |
| 3,014,750 | A | * | 12/1961 | Briggs | 294/58 |
| D198,979 | S | * | 8/1964 | Petoe | D8/10 |
| 3,226,149 | A | * | 12/1965 | McJohnson | 294/50 |
| 5,503,445 | A | * | 4/1996 | Fontaine | 294/60 |

(Continued)

FOREIGN PATENT DOCUMENTS

| DE | 2216140 | * 10/1972 | 294/57 |

(Continued)

*Primary Examiner*—Dean J. Kramer
(74) *Attorney, Agent, or Firm*—Eckert Seamans Cherin & Mellott, LLC

(57) ABSTRACT

A hand-operated tool includes a tool head having a central longitudinal axis, a handle extending from the tool head, a connector securing the handle to the tool head, and a central step at an upper end of the tool head and at the central longitudinal axis. A length of the handle is preferably adjustable. The handle preferably includes a handle portion forming a triangle shaped closed loop and has an upper section extending perpendicular to a central longitudinal axis of the handle portion and lower sections angularly extending from ends of the upper section to the central longitudinal axis of the handle portion. The connector preferably includes a pair of laterally spaced apart and parallel lower portions having lower ends secured to the tool head, a central portion connecting the lower portions, and an upper portion centrally connected to the central portion and the handle.

18 Claims, 7 Drawing Sheets

U.S. PATENT DOCUMENTS

| | | | | |
|---|---|---|---|---|
| 5,606,772 | A | * | 3/1997 | Ilic .............................. 16/421 |
| 5,645,305 | A | * | 7/1997 | Lispi ........................... 294/58 |
| 5,795,000 | A | * | 8/1998 | Aldorasi ....................... 294/57 |
| 5,887,920 | A | * | 3/1999 | Perciful ....................... 294/57 |
| 6,419,290 | B1 | * | 7/2002 | Grayson et al. ............... 294/60 |

FOREIGN PATENT DOCUMENTS

| | | | | |
|---|---|---|---|---|
| GB | 810800 | * | 3/1959 | .................. 294/60 |

* cited by examiner

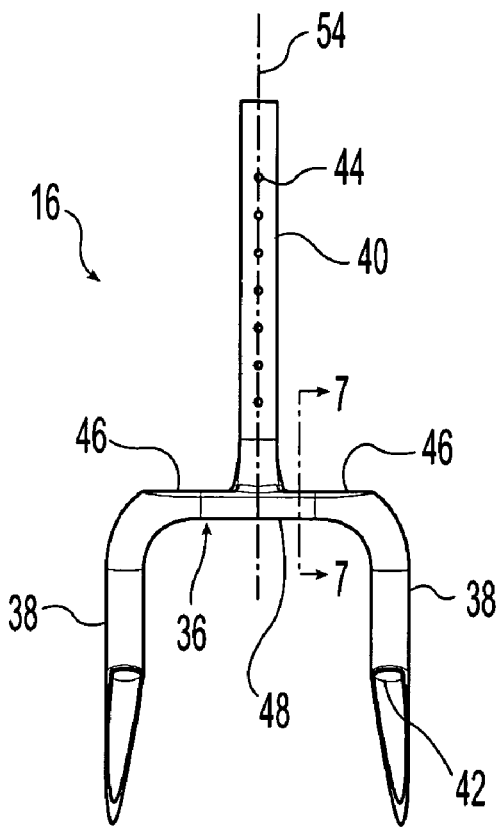 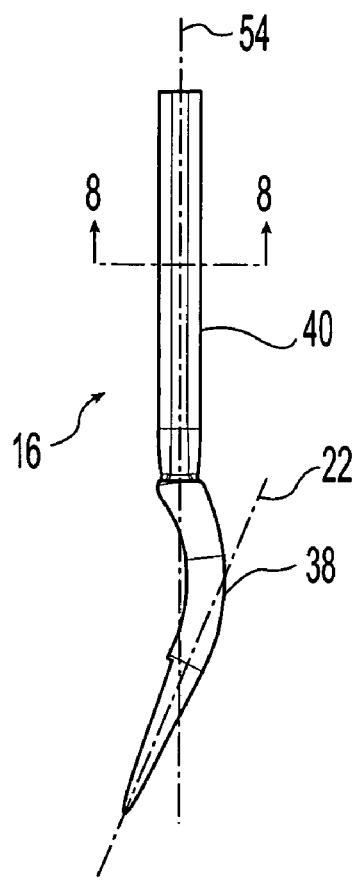
Fig. 5  Fig. 6
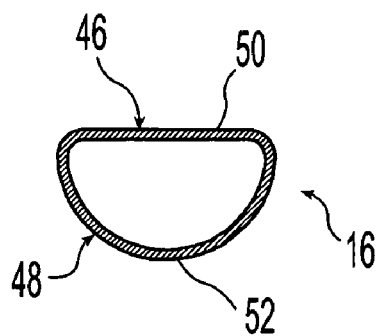 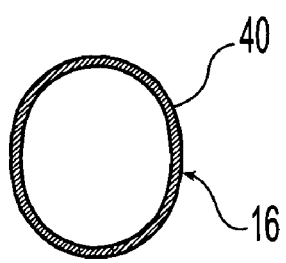
Fig. 7  Fig. 8

HAND-OPERATED TOOL WITH CENTRAL STEP

CROSS-REFERENCE TO RELATED APPLICATIONS

This application claims priority benefit from U.S. Provisional Patent Application No. 60/567,380 filed on Apr. 30, 2004, the disclosure of which is expressly incorporated herein in its entirety by reference.

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to tools and, more particularly, to hand-operated tools for lawn and gardening tasks and the like.

BACKGROUND OF THE INVENTION

A variety of different hand-operated tools are commonly used for lawn and gardening tasks such as, for example, spades, shovels, and forks which can require the user to step on a tool head to apply enough force to drive the tool head into the ground or other material to be by the tool. These hand-operated tools typically have a generally straight, cylindrical-shaped handle extending rearwardly from the tool head along a central longitudinal axis. In some instances, a rear end of the handle is provided with a grip such as, for example, a D-shaped grip. The upper end of the tool head is typically provided with abutments or steps located on opposite sides of the handle onto which the user can step to apply a force to the tool head into the ground. The tool head is typically made of a metal such as, for example, steel while the handle is typically made of a material such as, for example, wood, fiberglass, or plastic.

While these prior hand-operated tools may be adequate to perform intended lawn and gardening tasks under some conditions, they can be difficult and uncomfortable to grasp and hold, particularly with two hands, and can require the operator to have a relatively large amount of hand strength. Additionally, the user can become easily unbalanced and must apply an undesirably high amount of force when stepping on the tool head because the user must step at the side of the tool head offset from the central axis. This can particularly be a concern when the hand-operated tools are used by women, elderly, or handicapped users. Additionally, there is a never ending desire to improve certain characteristics of such hand-operated lawn and garden tools such as, for example, quality, reliability, versatility, weather-resistance, high strength, low weight, and low manufacturing costs. Accordingly, there is a need in the art for improved hand-operated lawn and garden tools.

SUMMARY OF THE INVENTION

The present invention provides a hand-operated tool which overcomes at least some of the above-noted problems of the related art. According to the present invention, a hand-operated tool comprises, in combination, a tool head having a central longitudinal axis, a handle upwardly extending from the tool head, and a central step at an upper end of the tool head and located at the central longitudinal axis.

According to another aspect of the present invention, a hand-operated tool comprises, in combination, a tool head having a central longitudinal axis, a handle upwardly extending from the tool head, and a connector securing the handle to the tool head. The connector forms a laterally extending forward grip located between the tool head and the handle and near the handle.

According to another aspect of the present invention, a hand-operated tool comprises, in combination, a tool head having a central longitudinal axis, a handle upwardly extending from the tool head, a connector securing the handle to the tool head, and a central step at an upper end of the tool head and located at the central longitudinal axis of the tool head. An effective length of the handle is adjustable. The handle includes a handle portion forming a generally triangle shaped closed loop and has an upper section extending perpendicular to a central longitudinal axis of the handle portion and lower sections angularly extending from ends of the upper section to the central longitudinal axis of the handle portion. The connector includes a pair of laterally spaced apart and parallel lower portions having lower ends secured to the tool head, a central portion connecting upper ends of the lower portions, and an upper portion centrally connected to the central portion and secured to the handle.

From the foregoing disclosure and the following more detailed description of various preferred embodiments it will be apparent to those skilled in the art that the present invention provides a significant advance in the technology of hand-operated lawn and garden tools. Particularly significant in this regard is the potential the invention affords for providing a high quality, reliable, versatile, and easy to use tool with improved operational performance. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein:

FIG. 5 is front elevational view of a wishbone-shaped of the hand-operated tool of FIGS. 1 to 4;

FIG. 6 is left-side elevational view of the wishbone-shaped of the hand-operated tool of FIG. 5;

FIG. 7 is cross sectional view of taken along line-7—7 of FIG. 5;

FIG. 8 is cross sectional view of taken along line-8—8 of FIG. 6;

Figure 1:
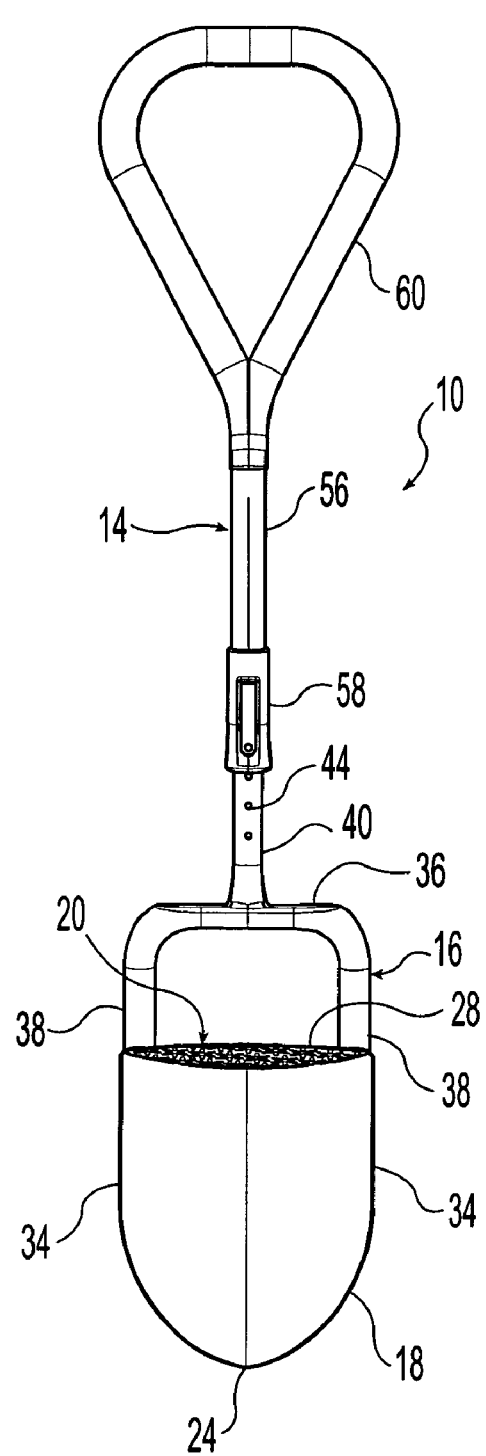
FIG. 1 is a front elevational view of a hand-operated tool according to a first preferred embodiment of the present invention wherein a tool head in the form of round-point shovel.

It should be understood that the appended drawings are not necessarily to scale, presenting a somewhat simplified representation of various preferred features illustrative of the basic principles of the invention. The specific design features of the hand-operated tools as disclosed herein, including, for example, specific dimensions, orientations, materials, configurations, and shapes of the various components will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the tools illustrated in the drawings. In general, up or upward refers to an upward direction within the plane of the paper in FIGS. 1, 5, 10, 12, and 14 and down or downward refers to a downward direction within the plane of the paper in FIGS. 1, 5, 10, 12, and 14. Also in general, fore or forward refers to a direction toward a tool head end of the hand-operated tools and aft or rearward refers to a direction toward a free end of the handle of the hand-operated tools.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved hand-operated tools disclosed herein. The following detailed discussion of various alternative and preferred embodiments will illustrate the general principles of the invention with reference to lawn and garden tools for use in home and garden environments. Other embodiments suitable for other applications will be apparent to those skilled in the art given the benefit of this disclosure such as, for example, hand-operated tools for use in construction, farm, and like environments.

Referring now to the drawings, FIGS. 1 to 4 illustrate a hand-operated tool 10 according to a preferred embodiment of the present invention. The illustrated hand-operated tool 10 includes a tool head 12, a handle 14 rearwardly extending from the tool head 12, and a connector 16 rigidly securing the handle 14 to the tool head 12 for hand-operated control of the tool head 12.

The illustrated tool head 12 is in the form of a round point shovel having a blade 18 and an abutment or step 20. The illustrated blade 18 forms a central longitudinal axis 22 for the tool head 12 and is arcuate or curved about the central longitudinal axis 22 so that the front surface of the blade 18 is concave. The illustrated blade 18 has a lower edge which forms a point 24 at the central longitudinal axis 22 and an upper edge which forms a flat end 26. The blade 18 is preferably formed by stamping but can alternatively be formed in any other suitable manner. The blade 18 also preferably comprises a metal such as, for example, C1035 steel but can alternatively comprise any other suitable material.

The illustrated step 20 is a substantially flat or planar sheet sized and shaped to cooperate with the flat end 26 of the blade 18 to form an upward facing abutment surface 28 located at the central longitudinal axis 22. The illustrated step 20 has rear edge 30 sized and shaped to match the arcuate shape of the blade flat end 26 and an front edge 32 which is sized and shaped so that the abutment surface 28 is relatively large, particularly at the longitudinal central axis 22. The illustrated front edge 32 is arcuate and extends forward beyond sides 34 of the blade 18 at the central longitudinal axis 22. The abutment surface 28 is preferably adapted to be slip-resistant surface. The illustrated abutment surface 28 is provided with an embossed tread pattern so that the abutment surface 28 is not a smooth surface. It is noted however, that the slip resistant surface can be provided in any other suitable manner such as, for example, a debossed tread pattern, a pattern of openings, a pattern of raised or lowered surface discontinuities, a slip-resistant coatings or coverings, or the like. The step 20 is preferably formed by stamping but can alternatively be formed in any other suitable manner. The step 20 also preferably comprises a metal such as, for example, C1035 steel but can alternatively comprise any other suitable material.

The illustrated step 20 is rigidly secured to the blade 18 at the flat end 26 of the blade 18 with the abutment surface 28 substantially perpendicular to the central longitudinal axis 22 and facing upward so that the user can step thereon. Located in this manner, the abutment surface 28 is located at the central longitudinal axis 22 of the tool head 12. The step 20 enables the user to centrally apply a force at the longitudinal axis 22 so that the user's full force is located directly over the tool head 12, and the target material, to reduce inadvertent twisting of the hand tool 10, to minimize slippage of the user's foot off of the hand tool 10, and to utilize the full force of the user to drive the blade 18 into the target. The illustrated step 20 abuts the flat end 26 of the blade 18 and is welded thereto. It is noted, however, that the step 20 can alternatively be secured to the blade 18 in any other suitable manner such as, for example, by riveting. It is also noted that the step 20 can alternatively be unitary with the blade 18 such as, for example, by forming.

As best shown in FIGS. 5 to 8, the connector 16 is sized and shaped for connecting the tool head 12 to the handle 14 without obstructing the abutment surface 28 of the step 20 at the central longitudinal axis 22. The illustrated connector 16 is generally "wish-bone" shaped having a laterally extending central portion 36, a pair of laterally spaced-apart and parallel lower or head portions 38 downwardly extending from outer ends of the central portion 36, and an upper or handle portion 40 upwardly extending from the center of the central portion 36. The connector 16 preferably comprises a metal such as, for example, cold rolled steel but can alternatively comprise any other suitable material. The illustrated connector 16 also is formed as a unitary, that is one-piece, member but it is noted that the connector 16 can alternatively can be manufactured as separate components and fastened together.

The illustrated lower portions 38 are sized and shaped to be rigidly secured to the tool head 12. The illustrated lower portions 38 are each tubular-shaped and are arcuate or curved so that the upper ends of the lower portions 38 are forward of the central longitudinal axis 22 so that the handle 14 is offset of the central longitudinal axis 22 to provide clearance for using the step 20 as described in more detail hereinafter. The illustrated lower portions 38 are circular shaped in cross-section but the lower portions 38 can alternatively have cross-sections of any other suitable shape. The illustrated lower portions 38 also have chamfered lower ends to mate with the rear surface of the blade 18. The chamfered lower ends also form an abutment 42. The lower portions 38 are rigidly secured to the tool head 12 with the abutment 42 engaging the abutment surface 28 of the step 20 (best shown in FIG. 4). The illustrated connector 16 is welded to the tool head 12 but it is noted that the connector 16 can alternatively be secured to the tool head 12 in any other suitable manner such as, for example, by riveting. It is also noted that the connector 16 can alternatively be unitary with the tool head 12 such as, for example, by forming.

The illustrated upper portion 40 is sized and shaped to be rigidly secured to the handle 14. The illustrated upper portion 40 is tubular-shaped and substantially straight. The illustrated upper portion 40 is provided with a plurality of longitudinally spaced apart openings 44 which are sized and shaped to cooperate with the handle 14 so that the handle longitudinally slides along the upper portion 40 of the connector 16 between fixed positions to adjust the effective length of the handle 14 as described in more detail hereinafter. The illustrated upper portion 40 is oval shaped in cross-section to prevent rotation of the handle 14 relative to the connector upper portion 40 but the upper portion 40 can alternatively have a cross-section of any other suitable shape.

Figure 2:
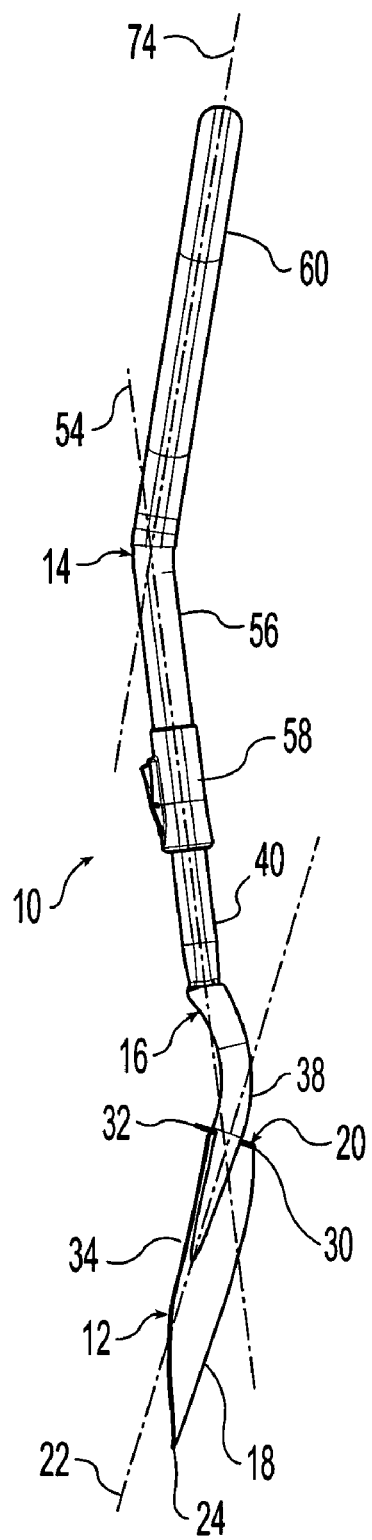
FIG. 2 is a left-side elevational view of the hand-operated tool of FIG. 1.
Figure 3:
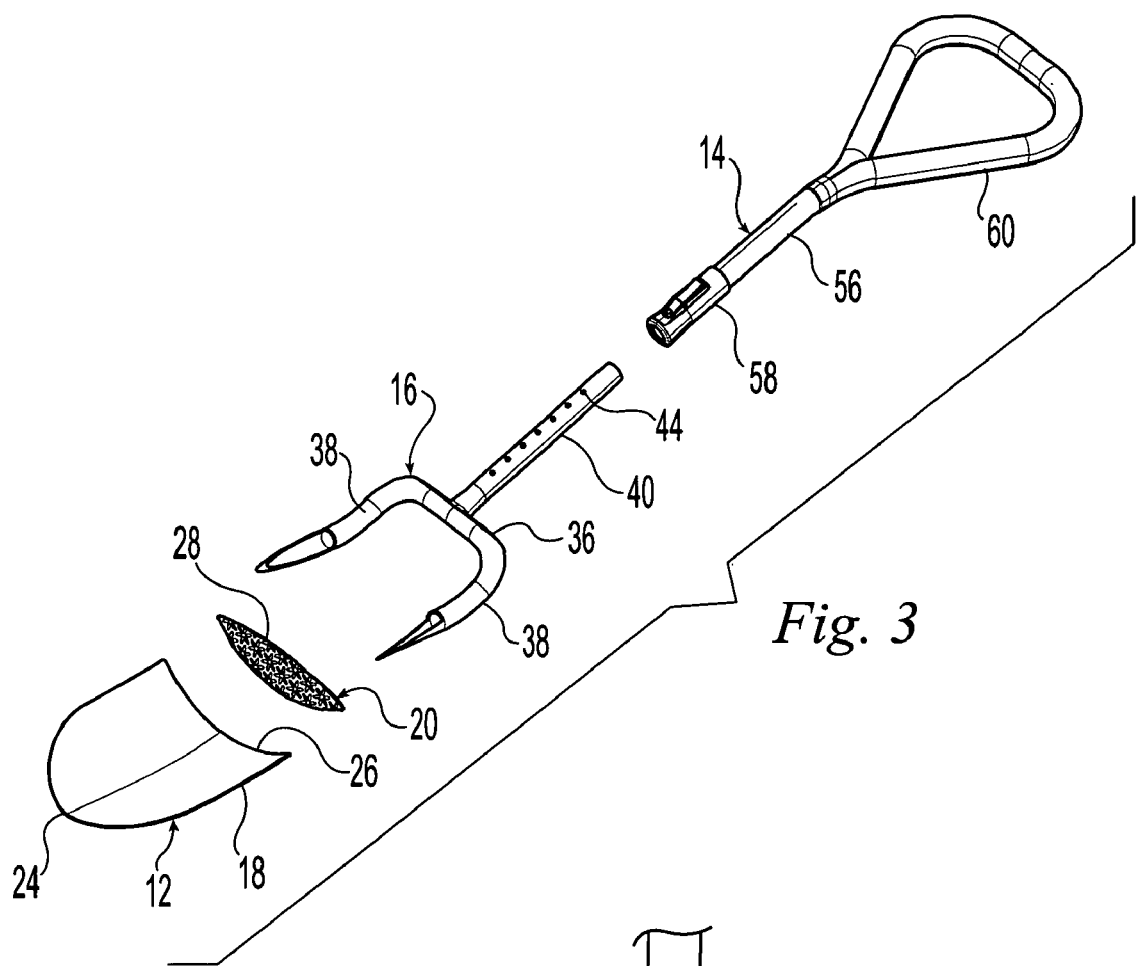
FIG. 3 is an exploded, front perspective view of the hand-operated tool of FIGS. 1 and 2.
Figure 4:
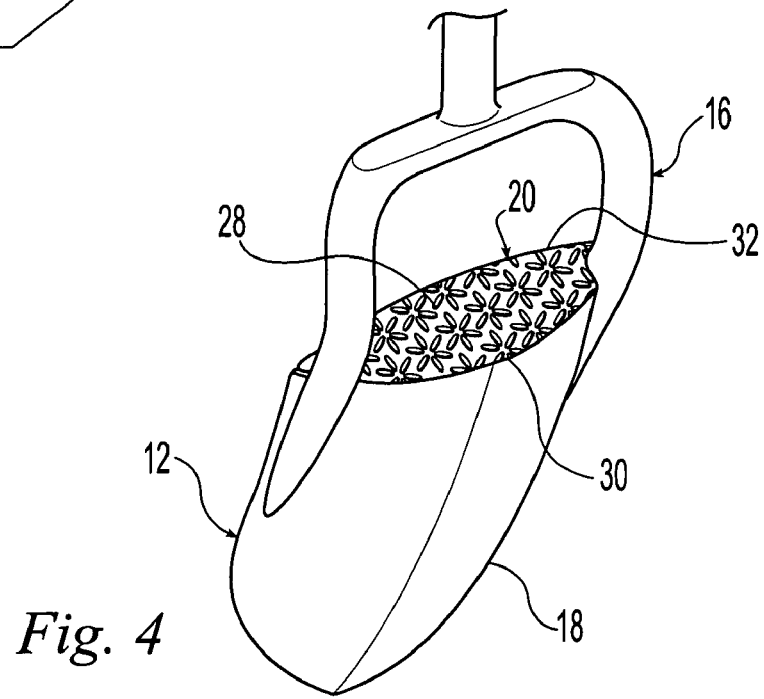
FIG. 4 is a rear perspective view of the tool head of the hand-operated tool of FIGS. 1 to 3.

The illustrated central portion 36 is sized and shaped to rigidly connect the lower portions 38 to the upper portion 40. The illustrated central portion 36 is tubular-shaped and substantially straight. The illustrated central portion 36 is half-circle shaped in cross-section to provide auxiliary steps 46 and a forward grip 48 but the central portion 36 can alternatively have a cross-section of any other suitable shape. The illustrated central portion 36 has substantially flat or planar abutment surfaces 50 which are generally upward facing and located on opposite sides of the upper portion 40 to form the auxiliary steps 46 which can be utilized by the user to provide a force to the tool head 12. As best shown in FIG. 2, the auxiliary steps 46 preferably form an acute angle A to the central step 20. The illustrated auxiliary steps 46 form and acute angle of about 30 degrees but any other suitable acute angle can alternatively be utilized. The illustrated central portion 36 also has a round surface 52 which is generally downward facing and located along the laterally extending length of the central portion 36 to form the forward grip 48. Located in this manner, the forward grip 48 is located at and perpendicular to a central longitudinal axis 54 of the connector 16, formed by the upper portion 40. The forward grip enables the user to grasp the hand tool 10 along the central longitudinal axis 54 of the connector 16 and near the tool head 12 so that the user can easily support the tool head 12 when loaded to reduce inadvertent twisting of the hand tool 10, to minimize slippage of the user's hand off of the hand tool 10, and to utilize the full strength of the user to support the loaded blade 18. The central forward grip 48 can be provided with a cushioned and/or slip resistant cover or surface if desired.

Figure 9:
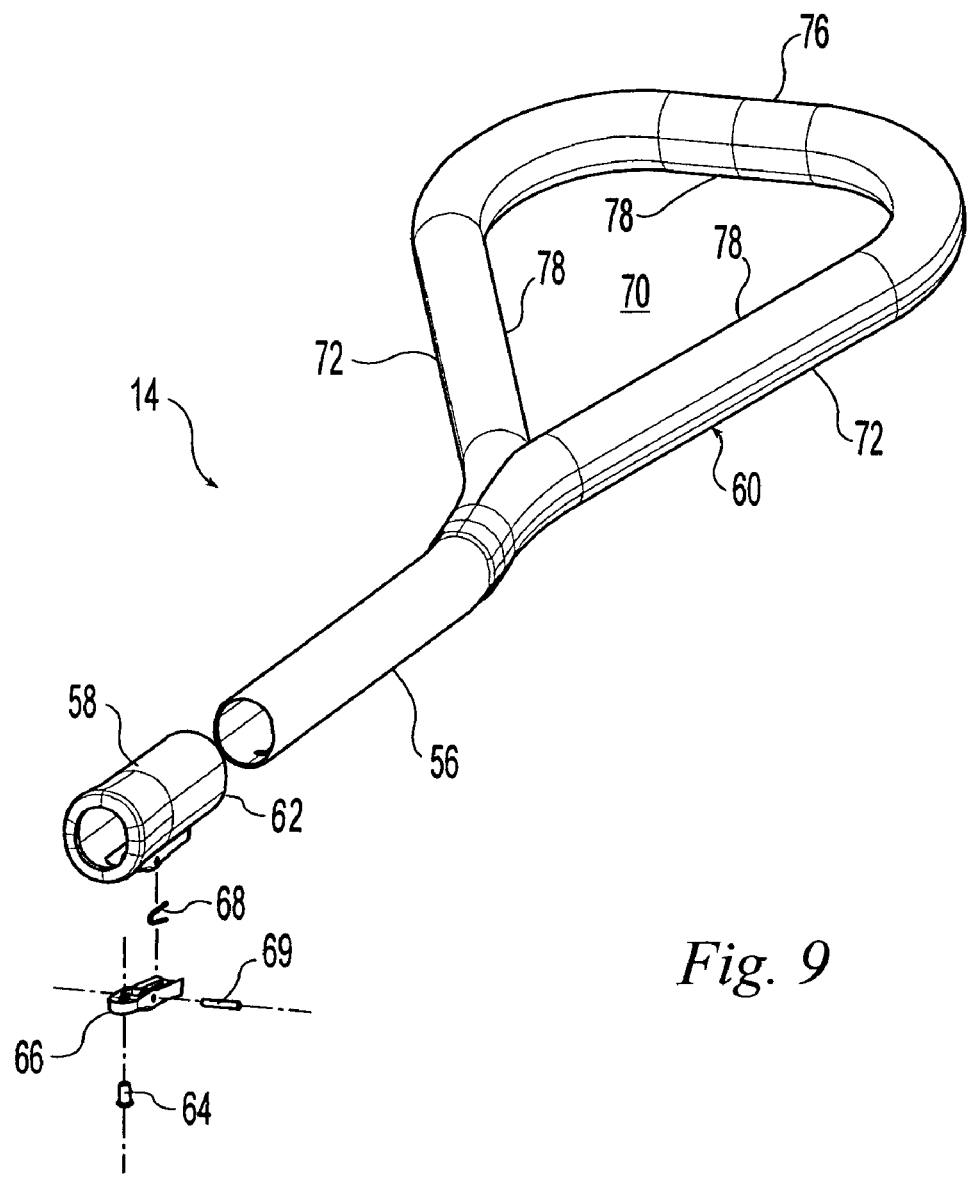
FIG. 9 is an exploded, front perspective view of a handle assembly of the hand-operated tool of FIGS. 1 to 4.

As best shown in FIG. 9, the illustrated handle 14 includes an arm portion 56 for rigidly connecting the handle 14 to the connector 16, a manually releasable lock 58 for releasably locking the handle 14 to the connector 16 at desired locations to selectively adjust the effective length of the handle 14, and a handle portion 60 extending from the arm portion 56 for grasping by the user. The arm and handle portions 56, 60 preferably comprise a metal such as, for example, cold rolled steel but can alternatively comprise any other suitable material. The illustrated arm and handle portions 56, 60 are formed as separate components and fastened together but it is noted that the arm and handle portions 56, 60 alternatively can be a unitary, that is one-piece, member.

The illustrated arm portion 56 is sized and shaped to cooperate with the upper portion 40 of the connector 16 to secure the arm portion 56 to the connector 16. The illustrated arm portion 56 is tubular-shaped and substantially straight. The illustrated arm portion 56 is oval shaped in cross-section to cooperated with the connector upper portion 40 and prevent rotation of the handle 14 relative to the connector upper portion 40 but the arm portion can alternatively have a cross-section of any other suitable shape. The illustrated arm portion 56 is sized to closely slide over the connector upper portion 40 but can alternatively be sized to closely slide therein.

The manually releasable lock 58 is adapted for releasably locking the handle 14 to connector 16 at desired locations to selectively adjust the effective length of the handle 14. The lock 58 is manually movable between a releasing position wherein the handle 14 can be longitudinally moved relative to the connector 16 and a locking position wherein the handle 14 is rigidly secured to the connector 16 to substantially prevent relative movement therebetween. The illustrated lock 58 includes a collar or body 62 adapted to secure the lock 58 to the handle arm portion 56, a lock pin 64 adapted to engage the openings 44 of the connector upper portion 40 to lock the connector 16 and the handle 14 together, a release arm or lever 66 adapted to manually move the lock pin 64 at least from the locking position to the releasing position, and a spring member 68 adapted to resiliently bias the lock pin 64 into the locking position. The collar 62 is sized and shaped to extend over the lower end of the handle portion 60 and slide over the connecter upper portion 40 therewith. The illustrated collar 62 is generally tubular shaped. The release lever 66 is pivotably mounted to the collar 62 at an opening on an upper side thereof. The illustrated release lever 66 is pivotably mounted about a laterally extending pit axis formed by a laterally extending dowel pin 69. The lock pin 64 is secured to a lower end of the release lever 66 and extends radially inward toward the central longitudinal axis 54 of the arm portion 56. The lock pin 64 is sized and shaped to be closely received into the openings 44 in the connector upper portion 40. The spring member 68 is located at an upper end of the release lever 66 to resiliently bias the upper end of the release lever 66 in a radially outward direction and the lower end of the release lever 66 in a radially inward direction so that the lock pin 64 is biased towards its locking position. The illustrated spring member 68 is a V-shaped wire spring but any other suitable type of spring member 68 can alternatively be utilized.

The user can selectively release the lock 58 to adjust the effective length of the handle 14 by depressing the upper end of the release lever 66 against the bias of the spring member 68 to outwardly pivot the lower end of the release lever 66 and move the lock pin 64 to its releasing position so that the handle 14 can longitudinally slide along the connector upper portion 40 to a desired position. When the user releases the release lever 66, the spring member 68 resiliently pivots the release lever 66 to automatically move the lock pin 64 towards its locking position. It is noted that while the illustrated tool 10 is provided with an adjustable length handle 14, the tool 10 can alternatively be provided with a fixed length handle. It is also noted that while the illustrated handle 14 is secured to the connector 16, the handle 14 can alternatively be formed unitary, that is as one piece, with the connector 16.

The illustrated handle portion 60 is in the form of a loop handle forming a closed opening 70. The illustrated handle portion 60 has a pair of lower sections 72 which angle outwardly from a central longitudinal axis 74 of the handle portion 60 at an acute angle in an upward direction (generally forming a V-shape) and an upper section 76 which is perpendicular to the central longitudinal axis 74 of the handle portion 60 and connects the upper ends of the lower sections 72. Formed in this manner, the handle portion 60 is generally triangular-shaped. Shaped in this manner, the handle portion 60 provides multiple grips 78 for the user. The handle portion 60 can be provided with a cushioned and/or slip resistant cover or surface if desired.

As best shown in FIG. 2, the illustrated handle portion 60 forms an acute angle B with the arm portion 56, and connector upper portion 40. The illustrated handle portion 60 forms an acute angle B of about 16 degrees with the arm portion 60 but any other suitable acute angle can be utilized. The illustrated handle portion 60 forms an acute angle C with the tool head 12 which is less than an acute angle D formed between the arm portion 56 and the tool head 12. The illustrated handle portion 60 forms an acute angle C of about 7 degrees with the tool head 12 while the illustrated arm portion 56 forms an acute angle of about 22 degrees with the tool head 12 but any other suitable acute angles can be utilized. Formed in this manner the connector upper portion 40 and handle arm portion 56 are positioned so that they are offset from the central longitudinal axis 22 of the tool head 12 to provide leg and knee room to step on the central step 20 with the handle portion 60 positioned so that it can be easily grasped by the user while stepping on the central step 20.

Figures 10, 11:
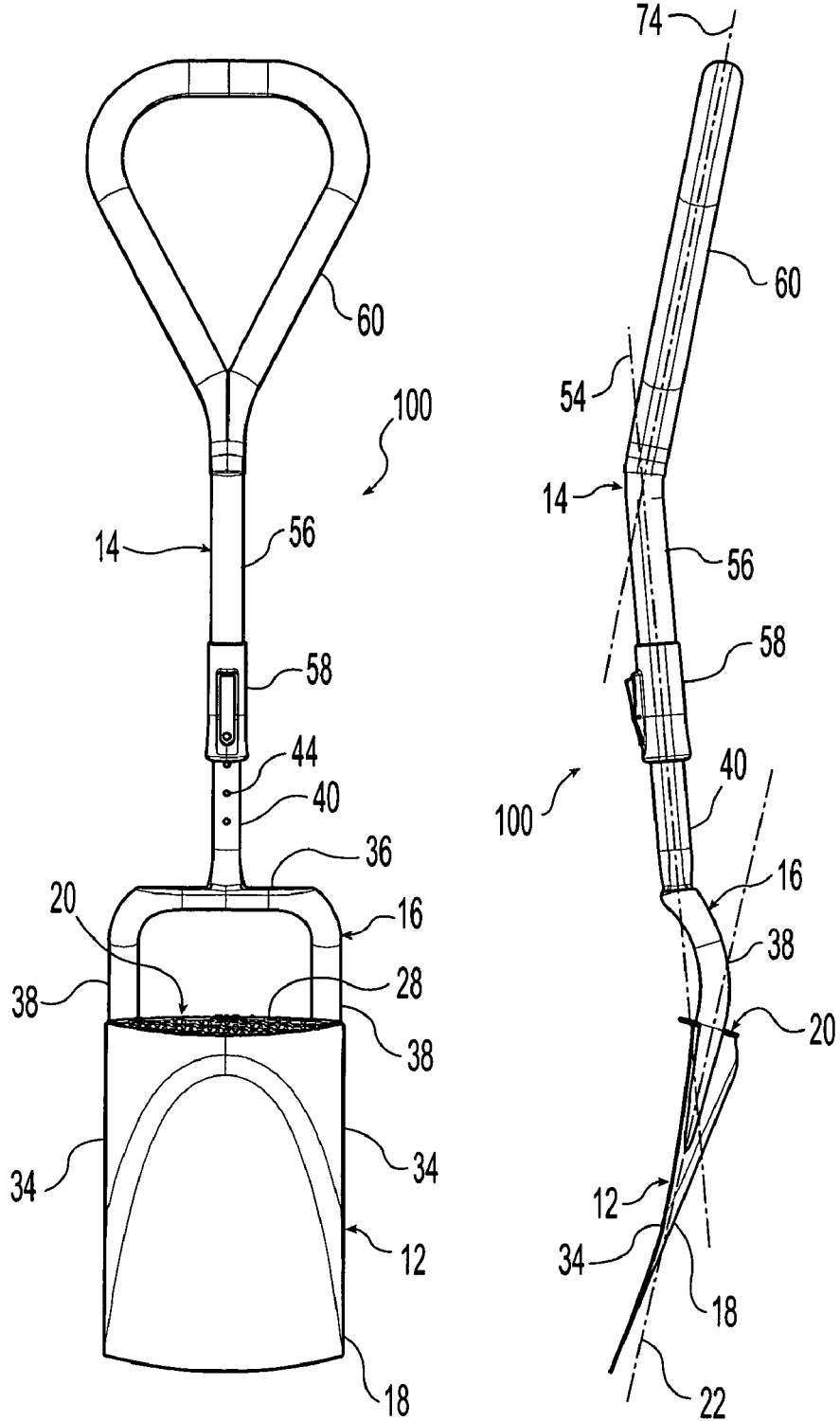
FIG. 10 is a front elevational view of a hand-operated tool according to a second preferred embodiment of the present invention wherein tool head is in the form of border/transfer shovel.
FIG. 11 is a left-side elevational view of the hand-operated tool of FIG. 10.

FIGS. 10 and 11 illustrates a hand-operated tool 100 according to a second embodiment of the invention wherein like reference numbers are used to indicate like structure. The tool 100 according to the second embodiment is substantially the same as the tool 10 of the first embodiment except that the tool head 12 is in the form of a border/transfer shovel. Thus, the tool 100 according to the second embodiment illustrates that the tool head 12 can be in forms other than the digging spade of the first embodiment. It is noted that the tool 100 can alternatively be provided with tool heads in any other suitable form.

Figure 12:
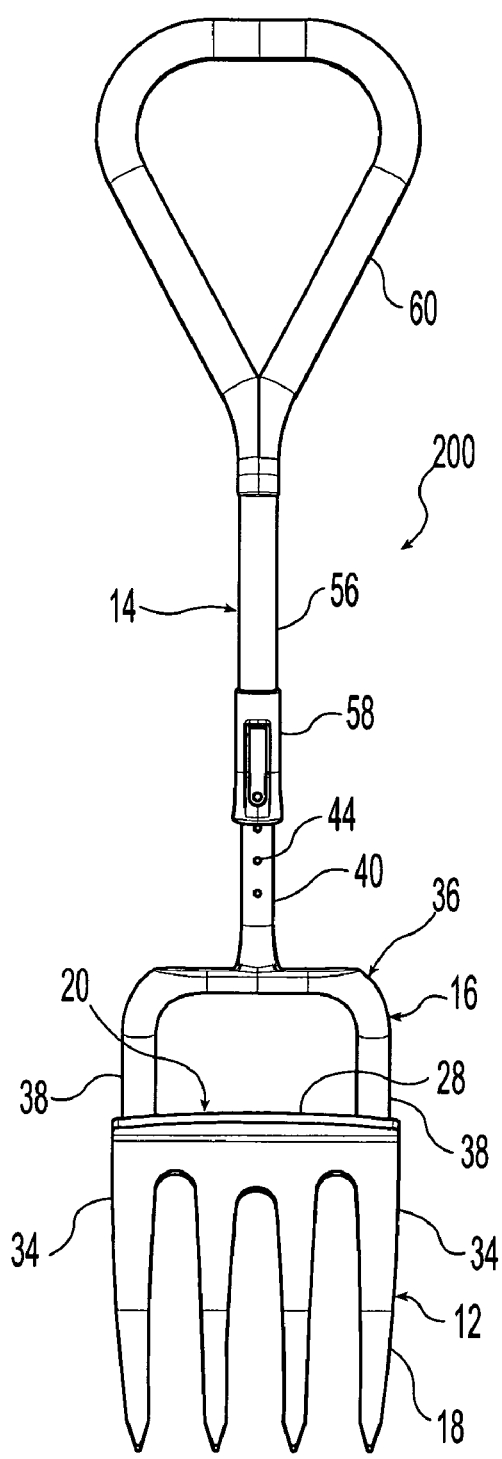
FIG. 12 is a front elevational view of a hand-operated tool according to a third preferred embodiment of the present invention wherein the tool head is in the form of a digging fork.
Figure 13:
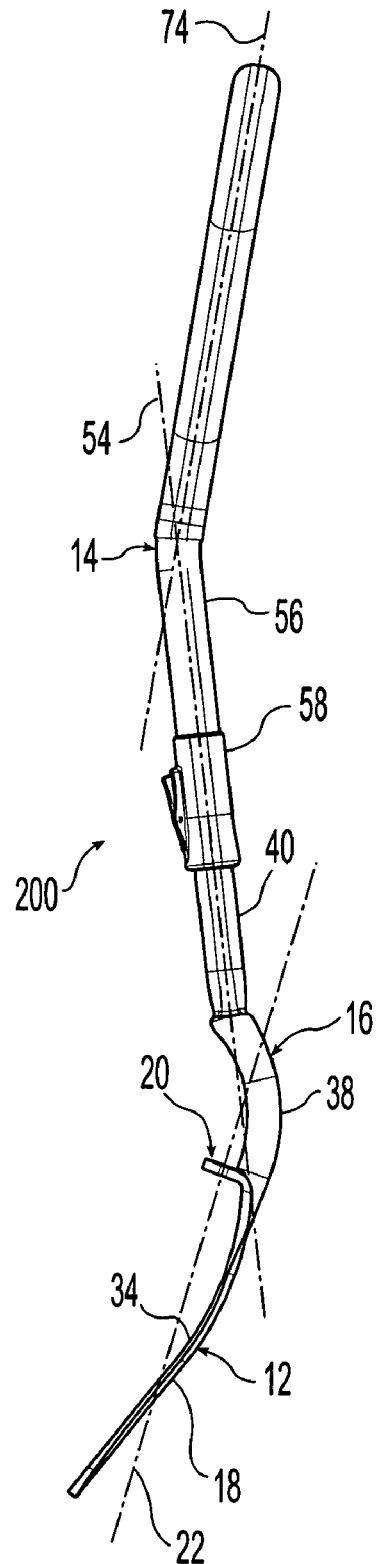
FIG. 13 is a left-side elevational view of the hand-operated tool of FIG. 12.

FIGS. 12 and 13 illustrate a hand-operated tool 200 according to a third embodiment of the invention wherein like reference numbers are used to indicate like structure. The tool 200 according to the third embodiment is substantially the same as the tools 10, 100 of the first and second embodiments except that the tool head 12 is in the form of a digging fork and the step 20 of the tool head 12 is formed integral, that is as one piece, with the blade 18. Thus, the tool 200 according to the third embodiment illustrates that the tool head 12 can be in forms other than the digging spade of the first embodiment and the border/transfer shovel of the second embodiment and can be formed in an integral one-piece manner.

Figures 14, 15:
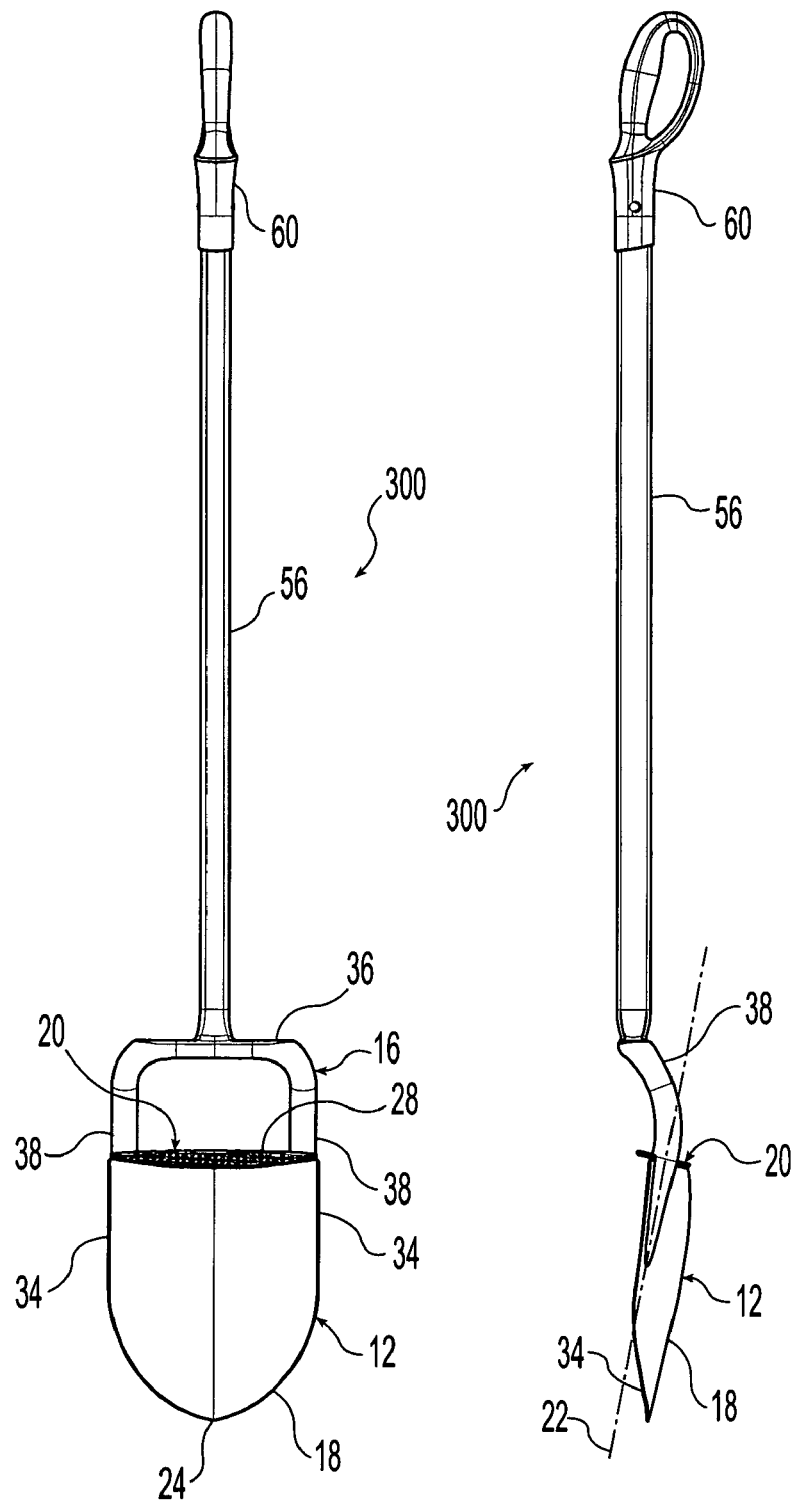
FIG. 14 is a front elevational view of a hand-operated tool according to a fourth preferred embodiment of the present invention wherein the handle is in the form of a fixed-length long handle.
FIG. 15 is a left-side elevational view of the hand-operated tool of FIG. 14.

FIGS. 14 and 15 illustrate a hand-operated tool 300 according to a fourth embodiment of the invention wherein like reference numbers are used to indicate like structure. The tool 300 according to the fourth embodiment is substantially the same as the tools 10, 100, 200 of the first to third embodiments except that the handle 14 is in the form of a long handle. Thus, the tool 300 according to the fourth embodiment illustrates that the handle 14 can be in forms other than the adjustable length handle 14 of the first to third embodiments and that the handle 14 can have shapes other than the loop of the first to third embodiments. The illustrated long handle 14 has an substantially straight, fixed length arm portion 56 secured to the upper portion 40 of the connector 16 and handle portion 60 in the form of a loop grip secured to the upper or free end of the arm portion 56. The illustrated loop grip has a cylindrically shaped grip surface 80 generally coaxial with the central longitudinal axis of the handle arm portion 56 and a closed loop formed at a lower side of the grip surface 80.

It is apparent from the foregoing detailed description that the present invention provides improved hand-operated tools 10, 100, 200, 300 which are relatively comfortable to use, require relatively low strength, are adjustable to suit a wide range of users, and reduce instability during use. It is also apparent that the improved hand tools are reliable and versatile and have and relatively low manufacturing costs.

From the foregoing disclosure and detailed description of certain preferred embodiments, it will be apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A hand-operated tool comprising, in combination:
   a tool head having a central longitudinal axis;
   a handle upwardly extending from the tool head;
   a connector securing the handle to the tool head;
   wherein the connector includes a pair of laterally spaced-apart lower portions having lower ends extending from the tool head, a central portion connecting upper ends of the lower portions, and an upper portion centrally extending from the central portion to the handle;
   a central step at an upper end of the tool head and located at the central longitudinal axis; and
   wherein the central portion forms auxiliary steps having upward facing planar abutment surfaces on opposite lateral sides of the upper portion.

2. The hand-operated tool according to claim 1, wherein the central step forms a planar and upward facing abutment surface.

3. The hand-operated tool according to claim 2, wherein the abutment surface is textured.

4. The hand-operated tool according to claim 2, wherein the abutment surface is substantially perpendicular to the central longitudinal axis of the tool head.

5. The hand-operated tool according to claim 1, wherein the central step is formed unitary with the tool head.

6. The hand-operated tool according to claim 1, wherein the central portion forms a laterally extending grip surface.

7. The hand-operated tool according to claim 1, wherein an effective length of the handle is adjustable.

8. The hand-operated tool according to claim 1, wherein the handle includes a handle portion forming a closed loop.

9. The hand-operated tool according to claim 8, wherein the handle portion is generally triangle shaped and has an upper section extending perpendicular to a central longitudinal axis of the handle portion and lower sections angularly extending from ends of the upper section to the central longitudinal axis of the handle portion.

10. The hand-operated tool according to claim 8, wherein the handle portion has a longitudinal central axis which forms an acute angle with the longitudinal axis of the tool head.

11. The hand-operated tool according to claim 10, wherein the handle includes an arm portion connecting the handle portion to the tool head and having a central longitudinal axis forming an acute angle with the central longitudinal axis of the handle portion.

12. The hand-operated tool according to claim 11, wherein an acute angle formed by the central longitudinal axis of the handle portion and the central longitudinal axis of the tool head is less than an acute angle formed between the central longitudinal axis of the arm portion and the central longitudinal axis of the tool head.

13. The hand-operated tool according to claim 1, wherein the handle is a fixed length long handle having a loop grip secured to an upper end thereof.

14. The hand-operated tool according to claim 13, wherein the loop grip has a grip surface generally coaxial with a central longitudinal axis of the handle and a closed loop formed at a lower side of the grip surface.

15. The hand-operated tool according to claim 14, wherein the central longitudinal axis forms an acute angle with the central longitudinal axis of the toot head.

16. The hand-operated tool according to claim 1, wherein the handle has a central longitudinal axis which forms an acute angle with the longitudinal axis of the tool head.

17. The hand-operated tool according to claim 1, wherein the lower portions, the central portion, and the upper portion are each at least partially tubular shaped.

18. The hand-operated tool according to claim 1, wherein the upper portion is at least partially oval shaped in cross-section.

* * * * *